Patented July 4, 1939

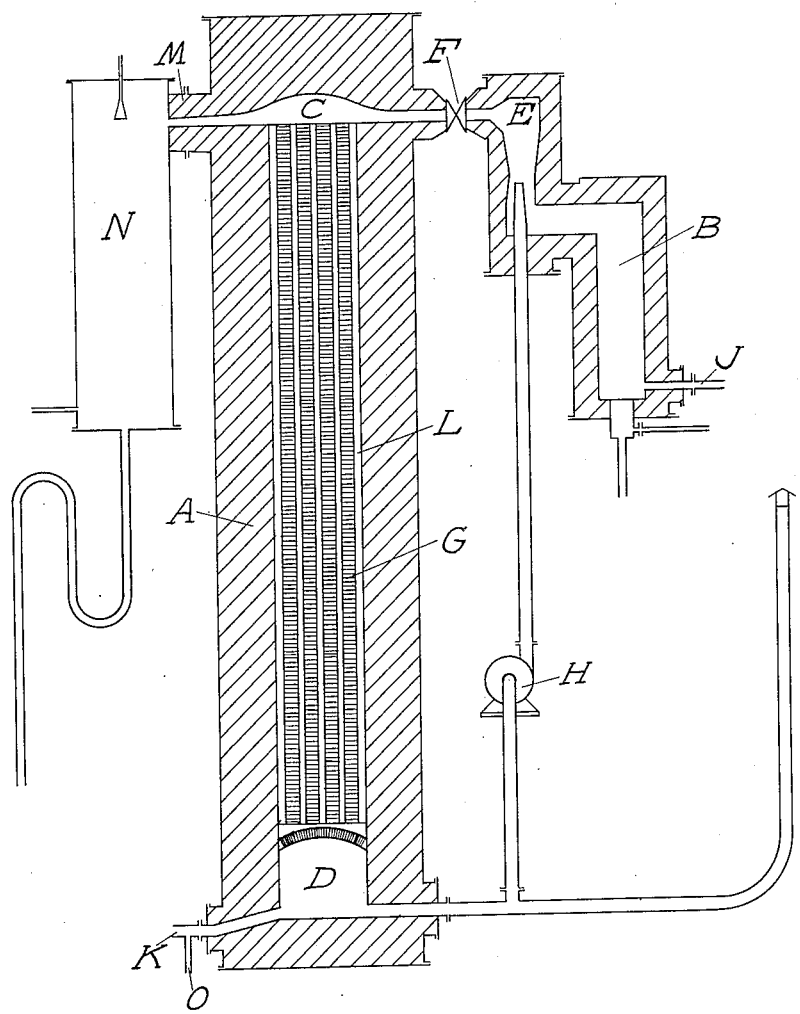

2,164,762

UNITED STATES PATENT OFFICE 2,164,762

APPARATUS FOR THE PRODUCTION OF GASEOUS UNSATURATED HYDROCARBONS

Walter Baumann and Otto Hemmann, Leuna, Germany, assignors to I. G. Farbenindustrie Aktiengesellschaft, Frankfort - on - the - Main, Germany Application November 16, 1935, Serial No. 50,134
In Germany November 23, 1934

6 Claims. (Cl. 23—277)

The present invention relates to the production of unsaturated hydrocarbons by thermal treatment of gaseous or vaporous hydrocarbons.

It has already been proposed to prepare unsaturated hydrocarbons, such as ethylene or propylene by subjecting gaseous or vaporous hydrocarbons to thermal treatment in reaction chambers which are provided with regularly shaped refractory materials and which are periodically heated to high temperatures by combustion gases.

Attempts have been made to improve the said process in a great variety of ways and certain advances obtained. For example it is known to be advantageous to cause the heating gases during the heating up of the apparatus to flow in the opposite direction to that in which the hydrocarbons to be converted flow during the reaction period. It has also been found to be advantageous to provide the reaction chamber with material having a good thermal conductivity and to keep the passage of the gas as straight and uniform as possible.

In spite of these precautions, however, the yields of gaseous olefines have hitherto been very unsatisfactory because either undesirable byproducts, such as naphthalene and tar, are formed by reason of polymerization of the reaction products or, with a shorter period during which the reaction materials are in the reaction chamber, a considerable fraction of the initial materials remains unchanged. Furthermore, the heating and reaction periods are only of short duration, and this necessitates a more frequent alternation of gases and also frequent scavenging. In this way not only does the manner of working become troublesome and expensive, but the nature of the reaction gases is injuriously affected by the dilution thereof and the yield is reduced by waste.

We have now found that the comparatively long time of contact of the gases with the heat accumulator necessary when working in so-called Cowper apparatus in order to transfer the heat can be maintained without the occurrence of the said drawbacks when care is taken that the gases or vapors to be treated are led through a Cowper apparatus in which the free cross-section available for the passage of gas is at the most one tenth and preferably only a few per cent of the total cross-section of the reaction chamber, the products formed being removed as rapidly as possible from the reaction chamber without passing through the chamber for the combustion of the heating substance.

By reason of the size of the Cowper apparatus and by reason of the structure of the brickwork thereof, care is taken for a sufficiently long period of contact between the gas and the heat-accumulating material, while by reason of the shortness of the path through which the products are led from the heated zone, the formation of troublesome byproducts is precluded.

The heating and reaction periods may be considerably lengthened by reason of the comparatively small free cross-section as compared with the total cross-section. In this way a considerable increase in the useful heat-accumulating capacity of the Cowper apparatus is obtained and heating and gasification periods may readily be lengthened to a duration of one hour and more. Furthermore scavenging is necessary less frequently and this leads to a further increase in the yield by reducing the waste by scavenging as well as to an improvement in the reaction gases and a simplification and cheapening of the operation.

The intensive transfer of heat which takes place in the Cowpers according to this invention operates a far-reaching conversion of the hydrocarbons supplied. However, in order to preclude the occurrence, on continuing heating the reaction gases, of undesirable side reactions impairing the favorable action which is brought about by the Cowper construction described, it is necessary to provide at the same time for a very rapid discharge of the reaction gases from the hot zone and to prevent their passing through the combustion chamber. Accordingly the combustion chamber is arranged at a distance from the course of passage of the reaction gases. While hitherto the reaction products, before leaving the apparatus, have been led positively through the combustion chamber heated to very high temperatures and have been changed therein in an undesirable manner, they flow according to this invention through the shortest possible path, without coming into contact with the combustion chamber, to the condenser or heat-exchanger in which care is also preferably taken, by a small cross-section for a high speed of flow. This arrangement is especially of great advantage when the combustion chamber has to be of large dimensions, such as is the case for example when for the purpose of regulating the reaction temperature or for reasons of heat economy a part of the hot combustion gases is led in a cycle in known manner.

The space between the lattice-work of the Cowper apparatus and the condenser or heat-exchanger is preferably made as small as is possible from a constructional point of view. It is advantageous to keep this space smaller than the total free space in the refractory insertion.

The penetration of the reaction gases into the combustion chamber and a consequent tarrying of the gases in spaces which are excessively hot are completely avoided if the addition of steam which is carried out from the combustion chamber in known manner after the heating period for the purpose of scavenging the Cowper apparatus is carried out to a limited extent during the reaction period.

The same effect is obtained by shutting off the combustion chamber by means of known closure members, such as stone stoppers, water-cooled slide valves or similar devices.

In order to obtain a uniform distribution of the heating gases in all slots and channels, the gases are led through at the highest possible linear speed. If the gas speeds of from 10 to 12 meters per second hitherto usual in Cowper apparatus are employed there is a danger that not only will there be an irregular distribution of heat to the slots, but that there will also occur a very different heating of the single layers so that the layers nearest to the inlet of the gases will become very hot while those which are farther removed will only become moderately hot. It is therefore preferable to lead the heating gases through the channels and slots at a higher speed of about 40 meters per second or more. By reason of the great resistance caused by this high speed, a uniform distribution of the heating gases to all slots and channels of the latticework is ensured and the heating of the single layers is thereby equalized. For this reason it is of no importance whether the heating gases are led upwards or downwards provided the direction is opposite to that of the reaction gases. Furthermore, by this means the heatng periods become equally as long as the reaction periods and this is of great importance for an economical operation of a Cowper apparatus.

When working according to this invention it has been found to be advantageous to subdivide the available free cross-section of the reaction chamber into many narrow channels which are less than 1 centimeter, preferably only a few millimeters, in width. This may be effected for example by providing massive refractory bricks, preferably those of high thermal conductivity, of about the size and shape of ordinary building bricks with grooves and projections and packing them so tightly that the distances between them are of the size given above; to ensure this, it is preferable to insert distance plates. There may also be employed, however, shaped bricks of the said or similar kind which have acquired during their preparation many circular, oval or rectangular channels, the bricks then being placed one on top of another; or both methods may be employed together. In this manner a much greater contact surface with the reaction and heating gases is obtained. The consequence of this is a more intensive transfer of heat and also an increase in the degree of efficiency of the heat-accumalation.

An apparatus suitable for carrying out the process according to this invention is shown diagrammatically in the accompanying drawing but the invention is not restricted to the particular apparatus shown.

The Cowper apparatus A is provided with bricks G of refractory ceramic material having a high content of silicon carbide and 25 by 11.5 by 6.5 centimeters in size in such manner that between the bricks G, which are provided with grooves and projections, there are formed slots L of 2.5 millimeters in width. The height of the refractory insertion is 5.6 meters: its free cross-section is 137.5 square centimeters and the total cross-section is 3737.5 square centimeters.

The heating of the Cowper apparatus is effected by carrying out the complete combustion of fuel in the combustion chamber B outside the Cowper apparatus and reducing the temperature of the heating gas to about 1000° C. by adding to the fresh combustion gases a part of the waste combustion gases outside the Cowper apparatus at E. The circulation of the waste combustion gases is effected by means of a blower H. The heating gas enters through the opened water-cooled slide valve F into the gas distribution chamber C (which has a capacity of 15 liters) and passes through the slots at a speed of 40 meters per second. After heating until the top end is at about 900° C. and the bottom end about 650° C., scavenging is effected in the same direction by means of steam from J. The slide valve F is then closed.

There are then led through in the opposite direction through K 60 cubic meters per hour of a gas containing hydrocarbons having the composition 3 per cent of $H_2$, 5 per cent of $CH_4$, 18.8 per cent of $C_2H_6$, 0.2 per cent of $C_2H_4$, 48 per cent of $C_3H_8$, 2 per cent of $C_3H_6$, 19 per cent of $C_4H_{10}$, 1 per cent of $C_4H_8$ and the remainder $N_2$, such as is obtained in the destructive hydrogenation of coals or the like. The speed of flow is somewhat higher at the commencement and somewhat lower at the end. The reaction gases leaving the Cowper apparatus at M are cooled directly thereafter in the spray cooler N by spraying in water. After a reaction period of one hour the temperature falls to such an extent that the reaction must be interrupted because further conversion of the hydrocarbons no longer takes place to a sufficient extent. The residual gas still remaining in the Cowper apparatus is rinsed out by means of steam in the same direction introduced at O and the Cowper is then heated up again.

During the reaction period there are obtained 120 cubic meters of gas having the following average analysis: 18 per cent of $H_2$, 37 per cent of $CH_4$, 25 per cent of $C_2H_4$, 6 per cent of $C_3H_6$, 1.5 per cent of $C_4H_8$, 11.5 per cent of homologues of methane and the remainder $N_2$. Furthermore there is formed 0.9 kilogram of oily polymerization products. The yield of ethylene and propylene is 75 per cent of the theoretical yield.

If the same gas mixture, on the other hand, be led through a Cowper apparatus provided with refractory bricks of the same kind but in such manner that slots of 20 millimeters in width are formed, i. e., so that the free cross-section is about one quarter of the total cross-section, and the products are led through the chamber C which has been converted into the combustion chamber by the inclusion of the chamber B, the reaction only lasts 7.5 minutes and there are obtained from 60 cubic meters of initial gas, only 90 cubic meters of reaction gas having the average composition: 18 per cent of hydrogen, 40 per cent of $CH_4$, 22 per cent of $C_2H_4$, 5 per cent of $C_3H_6$, 1 per cent of $C_4H_8$, 12 per cent of homologues of methane and the remainder $N_2$; there are also obtained 12 kilograms of oily polymerization products. The yield of ethylene and propylene is only 38 per cent of the theoretical yield.

What we claim is:

1. Apparatus for the production of gaseous unsaturated hydrocarbons comprising a Cowper converter having a reaction space therein, a heat accumulating brick work located in said reaction space and periodically heated to high temperatures by combustion gas, said brick work defining long vertical spaces for the passage of gas through said converter, said spaces having a free cross section amounting to at the most one tenth of the total cross section of said reaction space, means for cooling the reaction gases issuing from said converter, a short restricted passage beyond the end of said reaction space connecting said cooling means with said reaction space and a combustion chamber in which the formation of said combustion gas takes place, located at the same end of the furnace as said cooling means but arranged at such distance from the path of the reaction gases that these are prevented from passing through said chamber.

2. The apparatus as defined in claim 1, in which the free cross section of the spaces for the passage of gas is a few percent of the total cross section of the reaction space.

3. The apparatus as defined in claim 1, in which the spaces for the passage of gas are subdivided into a plurality of narrow channels less than 1 cm. in width.

4. The apparatus defined in claim 1, in which the area of the restricted passage connecting the cooling means with the reaction space is less than the total free space in the brick work.

5. The apparatus defined in claim 1, in which the combustion chamber is provided with means for closing the chamber against the reaction gases.

6. The apparatus as defined in claim 1 in which the spaces for the passage of gas are subdivided into a plurality of narrow straight channels extending the length of the brick work.

WALTER BAUMANN.
OTTO HEMMANN.